United States Patent
Bergsten et al.

(10) Patent No.: US 12,126,504 B2
(45) Date of Patent: *Oct. 22, 2024

(54) MEASURING METRICS OF A COMPUTER NETWORK

(71) Applicant: Juniper Networks, Inc., Sunnyvale, CA (US)

(72) Inventors: Anders Bergsten, Gammelstad (SE); Mikael Sundström, Luleå (SE)

(73) Assignee: JUNIPER NETWORKS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,426

(22) Filed: Feb. 27, 2023

(65) Prior Publication Data

US 2023/0216755 A1 Jul. 6, 2023

Related U.S. Application Data

(63) Continuation of application No. 17/045,700, filed as application No. PCT/EP2019/059129 on Apr. 10, 2019, now Pat. No. 11,595,273.

(30) Foreign Application Priority Data

Apr. 10, 2018 (SE) .................... 1850400-1

(51) Int. Cl.
*H04L 43/02* (2022.01)
(52) U.S. Cl.
CPC .................... *H04L 43/02* (2013.01)
(58) Field of Classification Search
CPC ... H04L 43/02; H04L 43/024; H04L 43/0829; H04L 43/0894; H04L 43/106
See application file for complete search history.

(56) References Cited

U.S. PATENT DOCUMENTS

| | | | |
|---|---|---|---|
| 7,260,627 B2 | 8/2007 | Kryskow, Jr. et al. |
| 8,438,275 B1 | 5/2013 | Brooker |
| 8,958,327 B2 | 2/2015 | Watve |
| 9,183,048 B2 | 11/2015 | Dice et al. |
| 9,210,053 B2 | 12/2015 | Chen et al. |

(Continued)

FOREIGN PATENT DOCUMENTS

| | | | |
|---|---|---|---|
| CN | 103259694 A | 8/2013 |
| CN | 105103130 A | 11/2015 |

(Continued)

OTHER PUBLICATIONS

Extended Search Report from counterpart European Application No. 22182547.4 dated Sep. 8, 2022, 7 pp.

(Continued)

*Primary Examiner* — Anh Nguyen
(74) *Attorney, Agent, or Firm* — Shumaker & Sieffert, P.A.

(57) ABSTRACT

A method of measuring (100) metrics of a computer network, comprising the steps of:

from a data source collecting (110) sets of data points during a sampling time period, wherein the set of data points constitute a sample, and uploading (120) each sample to a server for further processing (130), wherein from each sample, a fractile information instance is produced (131), wherein the fractile information has a type and each data source is associated (110*a*) with a fractile information type.

20 Claims, 3 Drawing Sheets

(56) References Cited

U.S. PATENT DOCUMENTS

| | | | |
|---|---|---|---|
| 9,220,017 | B2 | 12/2015 | Kobayashi et al. |
| 9,507,756 | B2 | 11/2016 | Arad et al. |
| 9,516,524 | B2 | 12/2016 | Johansson et al. |
| 9,832,106 | B2 | 11/2017 | Thomas et al. |
| 11,595,273 | B2 | 2/2023 | Bergsten et al. |
| 2005/0027858 | A1 | 2/2005 | Sloth et al. |
| 2005/0143982 | A1 | 6/2005 | He et al. |
| 2006/0153174 | A1* | 7/2006 | Towns-von Stauber ............... H04L 1/20 370/356 |
| 2009/0161570 | A1* | 6/2009 | Duffield ............... H04L 12/14 370/252 |
| 2011/0153603 | A1 | 6/2011 | Adiba et al. |
| 2013/0054661 | A1* | 2/2013 | Wegener ............... H03M 7/40 708/203 |
| 2013/0091168 | A1* | 4/2013 | Bhave ............... H04L 43/04 707/769 |
| 2013/0205020 | A1 | 8/2013 | Broda et al. |
| 2013/0262035 | A1* | 10/2013 | Mills ............... G06F 16/24568 702/188 |
| 2013/0301460 | A1 | 11/2013 | Bugenhagen et al. |
| 2014/0328196 | A1* | 11/2014 | Arad ............... H04L 41/147 370/252 |
| 2015/0089045 | A1 | 3/2015 | Agarwal et al. |
| 2015/0215057 | A1 | 7/2015 | Knowles |
| 2015/0341812 | A1* | 11/2015 | Dion ............... H04N 21/6373 370/252 |
| 2017/0093677 | A1 | 3/2017 | Skerry et al. |
| 2017/0257287 | A1 | 9/2017 | Kim et al. |
| 2017/0346909 | A1 | 11/2017 | Hou et al. |
| 2017/0373950 | A1 | 12/2017 | Szilagyi et al. |
| 2021/0351994 | A1* | 11/2021 | Bergsten ............... H04L 43/02 |

FOREIGN PATENT DOCUMENTS

| | | |
|---|---|---|
| CN | 106301998 A | 1/2017 |
| CN | 106961366 B | 7/2017 |
| CN | 106991080 A | 7/2017 |
| CN | 107431638 A | 12/2017 |
| CN | 107451049 A | 12/2017 |
| CN | 107835098 A | 3/2018 |
| EP | 3035628 A1 | 6/2016 |
| JP | 2012231236 A | 11/2012 |
| JP | 2014534726 A | 12/2014 |
| WO | 02095590 A1 | 11/2002 |
| WO | 2012081150 A1 | 6/2012 |

OTHER PUBLICATIONS

First Office Action and translation thereof, from counterpart Japanese Application No. 2020-555774 dated May 24, 2022, 6 pp.

International Preliminary Report on Patentability from corresponding International Application No. PCT/EP2019/059129, mailed on Jan. 10, 2020, 17 pages.

International Search Report from corresponding International Application No. PCT/EP2019/059129, mailed on Jul. 1, 2019, 2 pages.

Notice of Intent to Grant and Text Intended to Grant from counterpart European Application No. 19717832.0 dated Sep. 29, 2021, 36 pp.

Notice of Intent to Grant and Text Intended to Grant from counterpart European Application No. 19717832.0, dated Jun. 23, 2021, 35 pp.

Notice of Intent to Grant from counterpart Japanese Application No. 2020-555774 dated Nov. 22, 2022, 5 pp.

Prosecution History from U.S. Appl. No. 17/045,700, now issued U.S. Pat. No. 11,595,273, dated Feb. 22, 2022 through Jan. 27, 2023, 90 pp.

Response to Notice of Intent to Grant and Text Intended to Grant dated Jun. 23, 2021 from counterpart European Application No. 19717832.0, filed Sep. 14, 2021, 4 pp.

Third Notice of Intent to Grant and Text Intended to Grant from counterpart European Application No. 19717832.0 dated Mar. 2, 2022, 36 pp.

Notice of Intent to Grant and Text Intended to Grant from counterpart European Application No. 22182547.4 dated Aug. 2, 2023, 37 pp.

Notice of Intent to Grant from counterpart Chinese Application No. 201980025916.3 dated Jun. 6, 2023, 7 pp. Translation provided for only the Search Report.

Response to Extended Search Report dated Sep. 8, 2022, from counterpart European Application No. 22182547.4 filed May 23, 2023, 20 pp.

* cited by examiner

MEASURING METRICS OF A COMPUTER NETWORK

This application is a continuation of U.S. patent application Ser. No. 17/045,700, filed 6 Oct. 2020, which is a national stage application of 35 U.S.C. § 371 of PCT Application No. PCT/EP2019/059129, filed 10 Apr. 2019, which claims the benefit of SE Patent Application No. 1850400-1, filed 10 Apr. 2018. The entire contents of each of U.S. patent application Ser. No. 17/045,700, PCT Application No. PCT/EP2019/059129, and SE Patent Application No. 1850400-1 are incorporated herein by reference in their respective entireties.

TECHNICAL FIELD

The present invention is directed to a method and system of measuring metrics of, and preferably in, a computer network, such as measuring metrics of computer network management and quality of service.

BACKGROUND

In computer network management, as well as in many other application areas, it is common to measure different metrics such as latency, jitter, packet loss and throughput, to name a few.

In US20170093677 "Method and apparatus to securely measure quality of service end to end in a network", a method and apparatus for securely measuring quality-of-service (QoS) end-to-end in a network is described. It features a pair of endpoints configured to detect packets marked for QoS measurements, association of a timestamp (using a secure clock) with such packets, and reporting the timestamp along with packet identifying metadata to an external monitor.

In US 20170257287 A1 "Real-time quality of service monitoring apparatus and method", a real-time QoS monitoring apparatus is described. It features: an application registration unit configured to register at least one monitoring target application program for QoS measurement, a function explorer unit, also referred to as a function finder, configured to detect user-defined functions in application code, a loop statement explorer unit configured to detect loop-statements, a user-defined location explorer unit configured to detect user-defined locations, and a heartbeat generator configured to generate a plurality of heartbeat calls to correspond to the functions detected by the function finder.

In U.S. Pat. No. 8,958,327 B2 "Passive network latency monitoring", a method for measuring resident delay for each port in a node in a network and a peer delay between each pair of neighbor nodes in the network is described such that the latency between each pair of neighbor nodes in the network can be determined from these resident delays and peer delays. The method includes route weighting for a data packet through the nodes in the network using the determined latencies. Each node includes a switch having switchable connections. It is configured by a controller to send probe packets from an output port to a port in a neighbor node. The probe packet may include a time stamp and an identifier.

In U.S. Pat. No. 7,260,627 B2 "Real-time mesh measurement system stream latency and jitter measurements" is described. A method is described for accurately measuring system latency and latency jitter regarding packets of information moving through the network. The method features time-stamping packets of information, on their way through the network between the source and destination, using real-time clocks set to a universal standard. Latency and latency jitter are then determined by analyzing the time-stamped packets.

DESCRIPTION OF THE PRESENT INVENTION

While the patents mentioned above in background, as well as many other prior art publications, describe different ways of performing measurements to obtain data points, the prior art focuses entirely on methods of obtaining individual data points.

This is different from an aspect of the present invention which does not focus on how to obtain individual data points but rather on how to collect sets, or samples, of data points and efficiently upload these to a computing device such as a server to perform advanced statistical analysis such as compute rank statistics on these samples.

An aspect of the present invention is to perform advanced statistical analysis, such as rank statistics, and in particular how to compute and represent fractile information, from data sources, from which rank statistics can be computed with high accuracy without having access to the entire data source.

According to an embodiment of the present invention, there is provided a method of measuring metrics of a computer network, comprising the steps of:

from a plurality of data sources collecting data points
  wherein the set data points collected from each data source are collected during a sampling period that may be unique for each data source and set of data points
  wherein a set of data points, referred to as sample, is collected throughout each sampling period for each data source,
  wherein each data source is associated with a fractile information type that specifies how fractile information instances are processed and encoded, and decoded,
  wherein a reset is performed at the beginning of each sampling period for each data source yielding an empty fractile information instance.
  wherein collected data points, for each data source, are processed the by repeatedly updating the associated fractile information instance, throughout the sampling period,
  wherein the fractile information instance, for each data source, is compressed and transmitted to a computing device or server for further processing when the sampling period ends.

Herein, the term "fractile information" is defined as minimum pieces of information about each sample to upload and store at the computing device such as the server.

Herein, the term "further processing" includes advanced statistical analysis such as computing rank statistics of samples from the fractile information instance associated with the respective samples as well as aggregation of fractile information instances to enable computation of rank statistics on aggregated samples.

Herein, the term "instance" means a concrete occurrence of any object, existing usually during the runtime of a computer program.

Herein the terms "slave device", "test agent", and "probe" are related as follows: a slave device is associated with a server, responsible for performing measurements and thus serves as a probe, and is implemented as a test agent in some embodiments.

Herein the term "server" refers to a device connected with one or more slave devices via a computer network and responsible for receiving information about measurements from each such slave device, and making such information available for further processing. The server constitutes a "computing device" and may be implemented as a "control center" in some embodiments.

Herein the term "on-the-fly" with respect to operations performed on obtained data points means that the operation is performed immediately after the data point is obtained.

Herein the terms "sampling period", sampling time period", "sample period" and "sample time period", and variations thereof are equivalent.

According to various aspects and embodiments of the present invention, the solution according to the invention provides efficient compressions decompression, uploading, and aggregation of fractile information, as well as estimation of rank statistics from original- and aggregated fractile information.

First, definitions of various terms used will be explained before disclosure of various aspects and embodiments of the present invention.

Typically, according to various aspects of the present invention, the data points are collected periodically by slave devices, or probes, and a set of data points measured and/or collected from a data source during a sampling period constitutes a sample. The period between individual measurements as well as the length of the sampling period may vary depending on the metric measured, the traffic rate in the part of the network where the measurement takes place, and other factors. A sampling period is the smallest time-frame where statistical analysis of the data is supported. At the end of each sampling period, a representation of the sample (which can be the entire sample but typically is not) is uploaded to a computing device such as a server for further processing.

Data points can be values, measurements that are collected from a data source during a sampling period and thus constitute the sample. The sampling period as well as how many values each sample contain may differ between different data sources as well as between different samples from the same data source.

From each sample, typically from each data source, an instance of fractile information, or in other words, "fractile information instance", is produced. Fractile information is the preferred representation of a sample, to be up-loaded to the server, which enables estimation of rank statistics from samples without having access to the full sample.

While in the preferred embodiment the fractile information is produced, by continuously updating it with collected data points throughout the sampling period, by the slave device and uploaded to the server at the end of the sampling period, alternative embodiments where either the entire sample is up-loaded to the server at the end of a sampling period, from which the server produces the fractile information instance from the full sample, or every single data point is up-loaded in real-time to the server from which the server produces the fractile information instance, by continuously updating it with collected data points throughout the sampling period, or anything in between these two extremes.

Fractile information has a type and typically each data source is therefore associated to a fractile information type.

Each instance of fractile information is typically compressed, and uploaded to the server. Normally, the overall method of compression, such as from the methods described, is the same between different data sources but it does not have to be. In a general case, typically each data source must therefore be associated with a compression method. When storing an instance of fractile information on the server, some additional information may also be stored to facilitate following computation of fractile estimates. This may- or may not differ between different data sources, but if it does, each data source must also be associated with information about how this is done. In particular, if the method of using a pre-computed table of selected fractiles is used, the fractile selection typically needs to be associated with the data source as part of the configuration.

To save space at the server, according to an embodiment, fractile information instances are aggregated. Scheduling of aggregation is defined by an aggregation scheme which can be different between different data sources. Therefore, typically according to an embodiment, each data source needs to be associated with an aggregation scheme.

The role of the server is typically to provide statistical analysis of samples and aggregates of samples (an aggregate is a super sample where information from several individual samples are combined). Such analysis includes, but is not limited to, extreme values (min, max), average, number of data points below/above-between pre-defined thresholds (threshold counter), and percentiles.

Extreme values, average and threshold counters are typically straight forward both with regards to individual samples and aggregates of samples.

For extreme values, the slave device can simply keep track of min and max during each sampling period and upload to the server at the end of the sampling period.

For average the slave device simply needs to keep track of the sum- and number of data points of a sample and upload these to the server at the end of the sampling period.

For threshold counters the slave device simply needs to keep track of how many values that falls below/above/between the thresholds and upload these to the server at the end of the sampling period.

According to an embodiment, it is also typically straight forward to aggregate extreme values, average and threshold counters at the server. The extreme value of an aggregate of two samples is the extreme value of the extreme values of the respective sample and the average of two samples is the sum of sums divided by the sum of number of values, and the threshold counter of two samples is the sum of the threshold counters of the respective samples.

The challenge is typically to deal with rank statistics such as percentiles. Even if we assume that a slave device has sufficient computational power to run a linear time selection algorithm to compute a predefined (e.g. 1%, 10%, 25%, 50%, 75%, 90% and 99%) set of percentiles at the end of a sampling period and upload these to the server, there is no way for the server to compute percentiles of aggregate samples merely from a selection of percentiles from individual samples.

To illustrate the problem, let us consider three samples X, Y and Z each consisting of 21 data points where x, y and z are the medians of X, Y and Z respectively.

Given only x, y and z without having access to any other data points in X, Y and Z, how can we compute the median of the set union X+Y+Z?

If x<y<z, it is tempting to guess that y is the best estimate of the median of the set union and it should be given the limited information available. We know for sure that there are 21 data points guaranteed to be smaller than y and 21 data points guaranteed to be larger than y. However, there are also 20 data points unrelated to y, as well as 20 data points unrelated to each of x and z. If all data points unrelated toy are smaller than y, then 41 data points are smaller than y and 21 data points larger than y making y a rather bad median estimate. On the other hand, if all data points unrelated to x are smaller than x, then 31 data points are smaller- and larger than x, respectively, making x a perfect median estimate.

Obviously, the quality of estimates will decline even further if estimates are computed from estimates and with every level of aggregation it will get even worse.

Accurate computation of percentiles of aggregated samples requires that each sample in its entirety, or at least a (value, frequency-) pair for each occurring value, is uploaded to- and stored at the server.

However, this may not be feasible for the following reasons:
The cost for sending samples between slave device and server is too high.
The cost for computation of percentiles from samples at the server is too high.
The cost for storing all samples at the server is too high.
Aggregating samples does not reduce storage requirements in the general case.

According to an objective, a technical problem to be solved by the preset invention is therefore to find a method to identify minimum pieces of information, which we herein will call fractile information about each sample to upload and store at the server. We define "a/b fractile", where $a<=b$, as more general rank statistics than percentile (which is merely a special case of fractile—the "a percentile" equals the "a/100 fractile"). Fractile information typically must support estimation of percentiles such that the computation requires less computational resources than computing percentiles from samples. It typically must also be possible to aggregate fractile information from several samples such that the aggregated fractile information properly represents all aggregated samples and at the same time does not need more storage than the fractile information about a single sample. Only this way will it be possible to implement a scheme where we can provide higher time-line granularity analysis of recent samples and lower granularity time-line analysis of past samples.

Example: Providing second based percentiles during the present minute, minute based percentile during the present hour, hourly based samples during the present day, etc. When a minute has passed, the 60 instances of second based fractile information are aggregated to a minute based fractile information, when an hour has passed the 60 instances of minute based fractile information are aggregated to an hourly based fractile information, and when a day has passed, the 24 instances of hourly based fractile information are aggregated to a daily based fractile information. With this scheme, the server needs to record at most 60 instances of fractile information for the present minute, 60 instances of fractile information for the present hour, 24 instances of fractile information for the present day and ~30 instances of fractile information for the present month. This gives a total of less than 120 instances of fractile information for a month even though full second based granularity is provided for recent samples. If no aggregation takes place, almost 2.6 million instances of fractile information needs to be stored in 30 days which is considerably larger than the 120 instances produced by the described aggregation scheme.

There are some of additional aspects of fractile information that must be considered as well for this to work which adds further to the technical challenge at hand.

Percentile/fractile information computed from fractile information will, in the general case, be estimates since 100% accurate percentiles require full samples which, as explained above, will be too "expensive" to up-load to the server and cannot be aggregated to save storage at the server. The accuracy of a fractile estimate is measured in absolute- and relative rank error. The absolute rank error is the absolute value of the difference in rank between the estimated fractile and the real fractile whereas the relative rank error is the absolute rank error divided by the size of the sample. E.g. if the median estimate among 1000 data points has rank 400, i.e. exactly 399 data points have smaller value, then the absolute rank error is 500−400=100 and the relative rank error is 100/1000=0.1=10%.

Fractile estimates should be as accurate as possible and naturally there will be a trade-off between accuracy and storage cost. I.e. the larger size of an instance of fractile information we allow, the more accurate estimate. Fractile information must therefore be individually configurable for each data source to allow the user to achieve a proper trade-off. Such configuration needs to include both the range and granularity of the data source. Furthermore, a compressions/decompression scheme for fractile information is needed to provide efficient upload to- and storage at the server.

For a given data source we normally have some idea of the range of values and the accuracy of measurement as well as if there are negative values, positive values or both.

For example, we may know that: latency cannot be measured more accurately than 1 microsecond, i.e. rounded to the closest microsecond and that latencies under 10 microseconds as well as latencies over 2 seconds are extremely rare.

Furthermore, whereas small values may need to be measured and recorded without further rounding, measurements close to the maximum have a very small relative rounding error compared to small values.

For example, with 1 microsecond granularity, the relative rounding error for a 10 microseconds measurement is $1/10=10\%$ (assuming rounding by truncation) whereas the rounding error for a 2 seconds measurement is $1/2000000=0.00005\%$. This suggest that we can perform further rounding of large values without increasing the maximum relative rounding error.

According to a preferred embodiment of the present invention a fractile information representation optimized to balance the relative error across measurements, and at the same time reduce the amount of data, is used. The principal representation of fractile information in this particular embodiment consists of an interval of exponents defining the values with smallest and largest absolute value and a fixed number of bits representing the significant figures or mantissa. For each combination of mantissa, that can be represented by the available hits, and exponent, within the specified exponent interval, we have a counter to keep track of how many of the data points of the sample are rounded to the value formed by the respective combinations of mantissa and exponent. There is a bijective mapping between (mantissa, exponent) pair and counter and we sometimes refer to the counter as bin or bucket (e.g. counts how many values that falls into the bin). The result is a histogram where each frequency counter keeps track of how many values that are rounded to the value formed by the (mantissa, exponent) pair associated with that counter.

Fractile information for different data sources may, of course, have different exponent intervals and bits available for mantissa. These parameters together with flags indicating negative- or positive values or both, together with a text string (typically a text identifying the data source) forms the type of the fractile information.

The server will have knowledge of the type of fractile information for each data source. Therefore, it suffices to upload a compressed version of the array of counters together with an identifier of the data source after completing each sample. Probes maintain (at least) two instances of fractile information to be able to start with a fresh/reset (e.g. all counters are zeroed) instance each new sampling period while keeping the instance from the previous sampling period intact until upload to the server has been confirmed after which it can be reset.

Whereas the preferred embodiment of the present invention uses a fractile information representation optimized to balance the relative error across measurements it does not in any way limit the scope- and spirit of the invention. A person skilled in the an will be able to use alternative representations of fractile information where data points are mapped to bin indices using other methods for functions) designed to meet other optimisation criteria. A person skilled in the art will further realize that such alternative representations- and mapping functions are included in the type information and that different fractile information instances may use completely different types as well as type representations.

Compressed instances of fractile information are typically stored 136 in a data base on the server using a time stamp, which identifies the time period of sampling represented by the fractile information, as key and the compressed fractile information as binary data (binary large object or BLOB).

Aggregation of two or more original instances of fractile information, representing the same data source, is typically achieved by first decompressing them and then computing new aggregate counters, one by one, by adding the corresponding counters from the original instances if fractile information. Note that there is nothing that distinguishes aggregated fractile information from non-aggregated fractile information except that the time stamp may represent a longer time interval and the counters have higher values. Therefore, it is straight forward to perform arbitrary levels of aggregation of aggregates, which is the whole purpose of this representation. However, if the purpose of aggregation is merely to compute percentiles of the accumulated time-period, the aggregate can be discarded when computation is completed whereas if the purpose is to save storage in the data base, the original instances of fractile information are deleted and the aggregate is compressed and inserted with a new time stamp representing the aggregated interval.

Computing fractiles from fractile information is typically straight forward. First, the fractile information is retrieved from the data base and decompressed. Then, the largest counter where sum of the previous counter is smaller than or equal to the target rank is located followed by computing the fractile estimate from the (mantissa, exponent) pair corresponding to the counter.

Now is also referred to appended drawing figures.

BRIEF DESCRIPTION OF DRAWING FIGURE

FIG. 3 is a flow-chart illustrating aggregating.
The following description of embodiments of the invention and reference to the appended drawing figure add considerable detail to the description above of the present invention. Its purpose is to provide a person skilled in the art with sufficient information to implement the preferred embodiment of the invention. The detailed description does not in any way limit the scope of the invention and a person skilled in the art will know how to generalize the detailed description to achieve the full scope of the claims Fractile Information Representation
FIG. 1 illustrates the principal operation of the preferred embodiment of the invention. In a first step a slave device starts 105 with an empty instance of fractile information, of adequate type for the data source in question, at the beginning of a sampling period S. This is followed by repeatedly collecting 110 data points P from a data source and processing each data point immediately, by updating the fractile information instance with the data point, until the sampling period ends and all data points P from the sample has been processed 120. Processing 120 herein means to by update 120 the fractile information instance F with each data point. When the sampling period S ends 121, the fractile information instance F representing the sample is uploaded 122 to the server for further processing 130.

Figure 2:
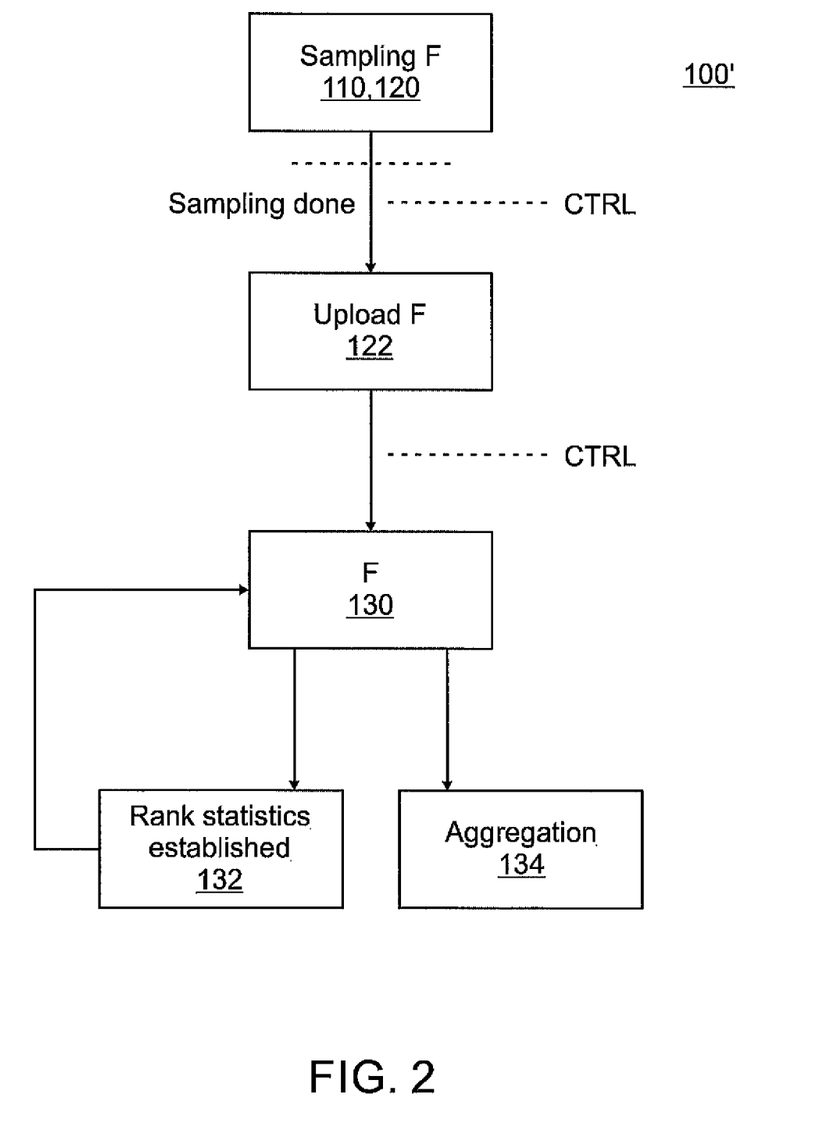
FIG. 2 is a flow-chart illustrating an illustrative embodiment of the present invention.

FIG. 2 illustrates an alternative embodiment 100' of the present invention. In a first step, from a data source, sets of data points are collected 110 during a sampling period S. The set of data points constitute a sample as explained above. Each sample is uploaded 122 to a server which immediately produces 130 a fractile information instance F, of adequate type for the data source in question, from the full sample. The fractile information instance F is thereafter available for further processing 130.

According to yet another embodiment of the present invention. In a first step, the server starts 105 with an empty fractile information instance of data adequate type for the data source in question Y100. Data points are collected 110 repeatedly from the data source throughout the sampling period S and either sent to the server one-by-one or in sets of several data points P until the sampling period ends 121. When the server receives a single data point or a so of data points it immediately updates the fractile information instance F with these data points. At the end of the sampling period S the fractile information instance F represents the sample as a whole and is available for further processing 130.

According to an embodiment, two or more fractile information instances F1, F2, . . . , Fm are associated 300 with each data source
  wherein, for each data source, exactly one fractile information instance F is active during each sampling period,
  wherein, for each data source, the non-active fractile information instances are passive during each sampling period,
  wherein, for each data source, the active fractile information instance $F_{empty}$ is empty 105 at the beginning a sampling period (S),
  wherein, for each data source, the passive fractile information instances are transmitted- and/or stored to be available for further processing 130,
  wherein, for each data source, at least one passive fractile information instance can be recycled at the end of each sampling period to become the empty active fractile information instance for the following sampling period.
Typically, the collection of data points 110 from one or more data sources are performed by test agents.
  wherein each test agent updates 120 the fractile information instance F associated with each data source, immediately after collecting each data point associated by the data source, throughout the sampling period S, wherein each test agent up-loads 122 fractile information instances (F) to a control center after the end of each sampling period (S), to be available for further processing According to an embodiment, the step of further processing 130 includes performing 132 advanced statistical analysis, and wherein the fractile information enables estimation 134 of rank statistics from samples without having access to the full sample.

According to an embodiment, the step of collecting 110 includes a sampling time period, wherein a period between individual measurements as well as the length of the sampling period is varied depending on one or more of: the metric measured, a traffic rate in a part of the network where the measurement takes place.

According to any embodiment where the fractile information representation is chosen to balance the relative error, a data point can be rounded off and represented by a (mantissa, exponent) pair but we have not yet explained which base to use for the exponent or how a (mantissa, exponent) pair is mapped to a bin or counter.

According to various embodiments, there are several options for this representation but the two most obvious are base 2 and base 10. In the implementation of our preferred embodiment we have chosen to represent mantissa as a normalized fraction which is a number larger than or equal to ½ and smaller than 1. In the C programming language which we have used to implement the preferred embodiment as a computer program product, there is a function frexp available for converting an original double precision floating point number to normalized fraction and corresponding exponent such that fraction*2^exponent equals the original number. Fractile information type contains the following parameters:

| | |
|---|---|
| name | Text string representing the name of the type |
| sigbits | Number of significant bits used to represent the mantissa. |
| expmin | Smallest power-of two exponent |
| expmax | Largest power-of-two exponent |
| negative | Flag indicating whether data points may be below zero |
| positive | Flag indicating whether data points may be above zero |

From the above basic parameters, we compute the following helper parameters:

| | |
|---|---|
| signum = 2^sigbits | Number of different mantissa values of normalized fraction (after rounding). |
| expnum = expmax − expmin + 1 | Number of different values of exponent. |
| absmin = 1/2 * 2^expmin | Smallest absolute value > 0 we can represent. |
| absmax = (1 − epsilon) * 2^expmax | Largest absolute value that can be represented, where epsilon is the smallest value > 0 than can be | represented.

rawmin=0 if negative=false, otherwise rawmin=−((signum/2)*expnum−1) Smallest raw counter (bin, bucket) index.

rawmax=0 if positive=false, otherwise rawmax=((signum/2)*expnum−1) Largest raw counter index.

rawnum=signum*expnum−1, if negative=positive=true, otherwise rawnum=signum/2*expnum Number of counters/bins/buckets.

Once these helper parameters are computed it becomes straight forward to map the value of each data point to a raw index in the range [rawmin, rawmax] and then adding −rawmin to obtain the actual counter/bin/bucket index.

The index of the counter for a value is computed as follows: First, the value is checked against absmin and absmax and capped to make sure it lies between these without changing sign. Then, the fraction and exponent are computed from value using frexp. This is followed by compressing fraction by adding ½ if fraction<0 or subtracting ½ if fraction>0 and storing the result in compress. The first part of rawindex is then computed by multiplying compress with signum, adding −½ to the product if compress<0 or adding ½ to the product if compress>0, and then finally truncate the decimals to obtain an integer. Computing the second part of rawindex is achieved by computing (exponent−expmin)*signum/2. The final rawindex is then obtained by subtracting the second part from the first part if compress<0 or adding the second part to the first part if compress>0. The computation of the final index is completed by adding −rawmin to rawindex.

Fractile Intimation Update and Maintenance

Fractile information is, besides the type- and helper parameters, represented by an array of rawnum counters. Updating the fractile information when a new data point is available is achieved by simply computing the index as described above and then increasing the counter associated with index, i.e. counter[index] by one.

Besides update, the only other maintenance on fractile information required it to reset all counters when upload to the server has been confirmed. This is trivially achieved by looping through all counters and setting them to zero.

Computation of Fractile Estimates

The principal operation of fractile computation is to first compute the target rank using the following formula: rank=a/b*n, where a and h are the fractile parameters and n is the number of data points that the fractile information represents.

Not all combinations of parameters are valid. For example, it does not make sense to compute the 1/1000 fractile of 10 data points. At least, n has to be larger than or equal to b, assuming that a/b is irreducible, but it makes more sense to require that n is at least 10 times larger than b. Furthermore, which fractiles that can be computed (with reasonable accuracy) also depends on rawnum. If there are too few counters, the fractile estimate becomes extremely rough.

Assuming that the parameters are OK, computation of the fractile estimate is achieved by finding index such that sum[index−1]<rank<=sum[index], where sum[index] =counter[0]+ . . . +counter[index].

This computation can either be performed using brute force, i.e. looping through the counters while summing until the sum exceeds rank, or by using a complementary data structure to speed up the search.

If the fractile information is compressed to max, i.e. no additional information to speed-up fractile computation is included in the compressed representation, and only one fractile computation is performed, brute force is the most efficient method.

However, if several fractile estimations needs to be computed it is typically more efficient to build a complementary data structure to speed up the computation. The compressed representation of such a complementary data structure constitute additional information used to speed-up fractile computation included in the compressed representation of the fractile information.

Figure 3:
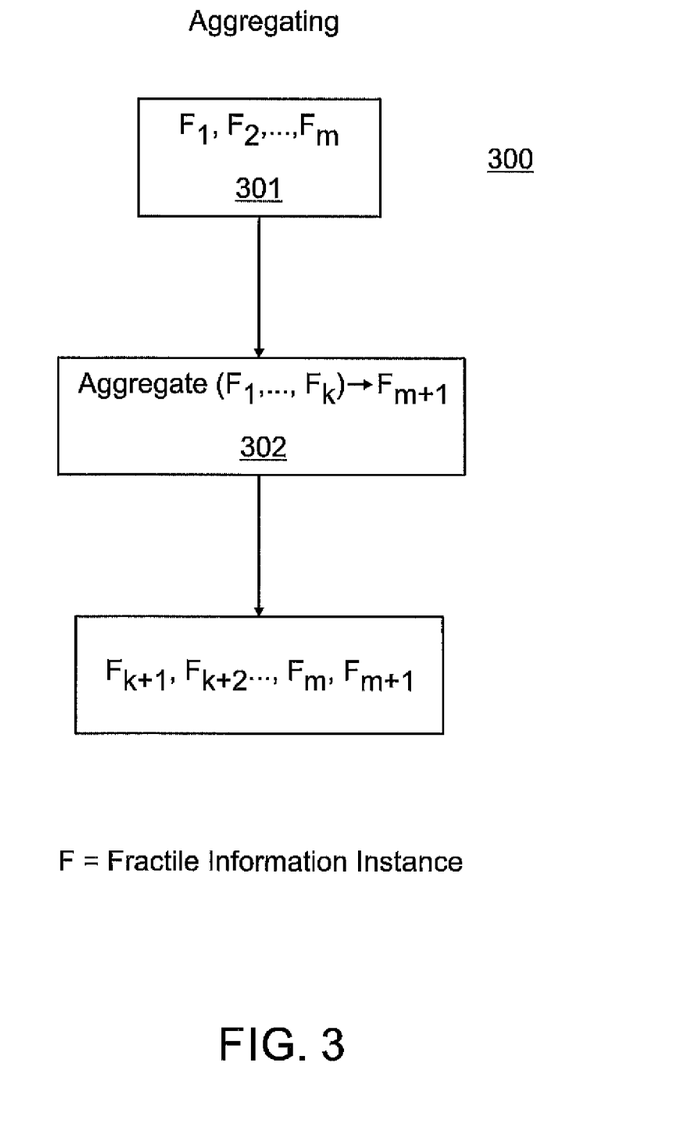

Now is referred to FIG. 3

The simplest complementary data structure is an aggregated sum array aggrsum where the size equals the square root of rawnum rounded up to the nearest integer. The counter array is logically partitioned into sub-arrays of equal size, except for the last sub-array, where each sub-array corresponds to one element of aggrsum such that aggrsum[0] equals the sum of the counters of sub-array zero, and aggrsum[uberindex] equals aggrsum[uberindex−1] plus the sum of the counters of sub-array uberindex.

Computation of a fractile estimate using the aggregated sum array is achieved by first finding the uberindex such that aggrsum[uberindex−1]<rank<=aggrsum[uberindex], and then jumping directly to sub-array uberindex to finish the search there using the method described above.

The computational complexity, i.e. amount of work, for computing fractile estimates using an aggregated sum array is proportional to the square root of rawnum, since both the size of the aggregated sum array and each of the sub-arrays of the counter array roughly equals the square root of rawnum. This is to be compared with the computational complexity for performing the computation without the aggregated sum-array which is proportional to rawnum. The storage overhead for using a one level aggregated sum array is proportional to the square root of rawnum.

Note that the aggregated sum method can be used also without a sum array at the bottom using the counters directly as we can use the aggregated sum array to quickly jump into the counter array and then start accumulating to find the target rank while making sure that we will only need to process a small portion of the counter array. In fact, according to an embodiment, this method is preferred as a full sum array will cause some problems when compressing it.

This method can be generalized to more levels as well to speed-up computation even more at the cost of using some extra storage. With two aggregated sum levels, the size of the sub-arrays is chosen as the cubic root of rawnum and the number of sub-arrays to the square of the cubic root of rawnum. At the mid-level, an aggregated sum array consisting of the square of the cubic root of rawnum stuns are stored and at the top level the array size equals the cubic root of rawnum.

In the following we show storage cost and computational cost for zero-, one-, and two levels of aggregated sum arrays to examine how the space vs. sped trade-offs plays out for a fixed value of rawnum of 1 million.

| Aggregation level | Zero levels | One level | Two levels |
|---|---|---|---|
| Computation | 1000000 | 1000 + 1000 = 2000 | 100 + 100 + 100 = 300 |
| Storage overhead | 0 | 1000 | 10100 |

Note that even for three levels, the storage overhead is fairly small compared to rawnum which determines the size of the counter array of 1 million integers.

A person skilled in the art will be able to generalize this to even more levels to achieve even higher speed of fractile estimate computations while trading some additional storage.

Another method to provide fast computation of fractile estimates is to compute the sum array (which, by definition, is sorted) directly and then perform binary search to find the index associated with the target rank. In fact, since each individual counter can be derived from the sum array, it may not even be necessary to store the counter array yielding zero storage overhead. In this way, the cost for computation will be proportional to the base two logarithm of rawnum, which for 1 million entries will be about 20. Organizing the sum-array such that locality of memory accesses- and cache line sizes can be exploited will reduce the computational cost even further. Assuming an Intel architecture where the cache line size is 512 bits and furthermore, assuming each aggregated sum requires 32 bits, we can search 16 aggregated sums in each memory access and achieve a search fan-out of 17. Since $17^5$ is larger than 1 million, this means that we reduce the computation cost to 5 in our example (assuming the cost for memory reads from main memory into cache dominates the cost for computation).

Yet another method of providing fast fractile computations is using a table of selected fractiles, which are pre-computed, and for each of these, record the index into the counter array where the corresponding counter is stored. In this way, the computation of the pre-computed fractiles becomes ultra-fast (i.e. constant time) while computations of other fractiles starts with a base counter, which is the closest smaller pre-computed fractile (e.g. the 75% percentile, if the table contains 50%, 75%, and 90%, and we want to compute the 80% percentile), followed by looping through the counters beyond the base counter until the target rank of the 80% percentile is reached. This however rewires that for each pre-computed fractile, the corresponding sum, which we would have if there were a sum array, is computed and stored in the table. Otherwise, it will not be possible to hit the target rank accurately.

Aggregation of Fractile Information

Aggregation of fractile information is straight forward. Given two instances X and Y of fractile information representing the same data source (from which it follows that they are of the same type), aggregation is performed by simply looping through the array of counters X.counter[0 . . . rawnum−1] and Y.counter[0 . . . rawnum−1] and adding the counters for each index. That is, for each index=0 . . . rawnum−1, A.counter[index]=X.counter[index]+Y.counter[index], where A is the aggregated fractile information.

Furthermore, it is also straight forward to perform aggregation by adding the sums together (if the fractile information is represented by sums of counters rather than counters) since $A$.sum[index] =

$A$.counter[0] + ... + $A$.counter[index] == ($X$.counter[0] + $Y$.counter[0]) +

... + ($X$.counter[index] + $Y$.counter[index]) ==

($X$.counter[0] + ... + $X$.counter[index]) +

($Y$.counter[0] + ... + $Y$.counter[index]) == $X$.sum[index] + $Y$.sum[index].

Compression and Decompression of Fractile Information

The storage cost of fractile information is typically dominated by the storage cost of the array of counters and sums of counters. Everything else such as type, average and extreme values, if these are stored together with the fractile information, requires constant amount of storage and the storage cost for an aggregated sum array, if one is used, is negligible compared to the cost for the counter array.

If the type is rich, meaning that we have high granularity and many counters, a lot of the counters in the fractile information representing a sample may be zero and thus contain no information. We expect all non-zero values to be random within the constraints set by the size of the sample etc. i.e. we do not expect a fraction of the counters to have the same value. Under these assumptions, we clearly should be able to compress a counter array by avoiding storing zeroes and only store counters that are not zero. However, if we are using a sum array, no sums, except the sums corresponding to counters preceding the first non-zero counter, will be zero. Therefore, we will avoid representations including a sum array of the same size as the counter array.

In what follows, we will describe in detail how to compress and decompress the counter array, when to use the different representations and, why this works.

First, given a counter array of size n, we define density as the number of non-zero counters. Furthermore, let counterbits be the number of bits used to represent a counter and indexbits be the number of bits used to represent an index into the counter array.

We work with three different representations depending on whether the density is low, medium or high.

Low density: For each index where counter[index]>0, we store an (index, counter[index]) pair. Furthermore, we record the size of the list, i.e. the number of pairs.

Medium density: For each index where counter[index]>0, we store the counter. In addition, we have a bit array of size n, where each bit corresponds to a counter and where only bits associated with stored counters are set.

High density: We store the counter array uncompressed.

Now, let us investigate the respective storage costs for these three methods to derive a formula for computing thresholds determining when to use which method. Let $S_L$, $S_M$, and $S_H$ be the number of bits required for the low density-, medium density-, and the high density representation respectively.

We have:

$$S_L = \text{density} * (\text{counterbits} + \text{indexbits}) * \text{indexbits}$$

$$S_M = \text{density} * \text{counterbits} + n$$

$$S_H = n * \text{counterbits}$$

The criteria for using the low-density representation rather than the medium-density representation is that $S_L < S_M$. That is, $$\text{density}*(\text{counterbits}+\text{indexbits})+ \text{indexbits} < \text{density}*\text{counterbits}+n$$

$$\text{density}*(\text{counterbits}+\text{indexbits})- \text{density}*\text{counterbits} < n - \text{indexbits}$$

$$\text{density}*(\text{counterbits}+\text{indexbits}-\text{counterbits}) < n - \text{indexbits}$$

$$\text{density} < (n - \text{indexbits})/\text{indexbits}$$

The criteria for using the medium-density representation rather than the high-density representation is that $S_M < S_H$. That is, $$\text{density}*\text{counterbits}+n < n*\text{counterbits}$$

$$\text{density}*\text{counterbits} < n*\text{counterbits}-n$$

$$\text{density} < (n*\text{counterbits}-n)/\text{counterbits}$$

Typically, counterbits is 32 bits which means that the bit array used in the medium-density case may cause a large storage cost overhead at the low end of the medium-density range. It is possible to use a similar method recursively to compress also the bit array. In principle, this hybrid approach is the same as with the aggregated sum array described above. The bit array is divided into chunks of equal size and another bit array with one bit for each chunk is used to record which chunks that contain only zeroes and which chunks contain ones. In this case, we only need to store the aggregated bit array, which for example can be 32 times smaller than the original and then only the 32-bit chunks where not all bits are zero.

Compressing a counter array is done by first analyzing it to find the density. Then the appropriate compression method as described above.

Low-density compression is achieved by looping through the counter array and collecting the non-zero counters and their indices and storing these in a pre-allocated empty array of size density, followed by storing the density. Decompression is achieved by first allocating an empty and reset (all counters are zeroed) instance of fractile information based on the information available in the type. Then we loop through the array of pairs and for each pair (index, value) the value is assigned to counter[index] in the empty fractile information instance.

Medium density compression is achieved by first allocating an empty bit array of size a and a small counter array of size density. The original counter array is then looped through and each non-zero counter is stored in the next available position in the small counter array while, at the same time, setting the hit in the bit array with the same index as the counter in the original counter array. As with the low-density representation, decompression starts by allocating an empty fractile information instance. This is followed by starting with the first counter in the small counter array and looping through the bit array until a set bit is found followed by writing the value of the current counter the small counter array to empty fractile information instance at the same index as the index of the set bit. After writing to the empty instance, we move forward in the small counter array so that the next counter becomes the current counter.

Compression and decompression when using the hybrid method is essentially identical to compression and decompression when using the medium-density approach, with a minor difference in how the bit array is handled.

Type Reduction

Normally, the type of fractile information does not change for a given data source. However, in some circumstances the analysis of a data source may have started by using an overly rich type capable of computing estimates with high accuracy in value ranges where nothing interesting happens.

It is always possible to take an instance of fractile information of a rich type and down-sample it to be represented as a less rich type. This makes it possible to reduce the type of the data source and then, when performing aggregation, the richer typed instance is down-sampled into the less rich type before performing the aggregation.

As disclosed above the present invention according to various aspects and embodiments describes how to compute and represent fractile information from data sources.

Method steps of the invention may be performed by a programmable processor executing a program of instructions to perform functions of the invention by operating on input data and generating output.

The invention may be implemented in digital electronically circuitry, or in computer hardware, firmware, software, or in combinations of them.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Figure 1:
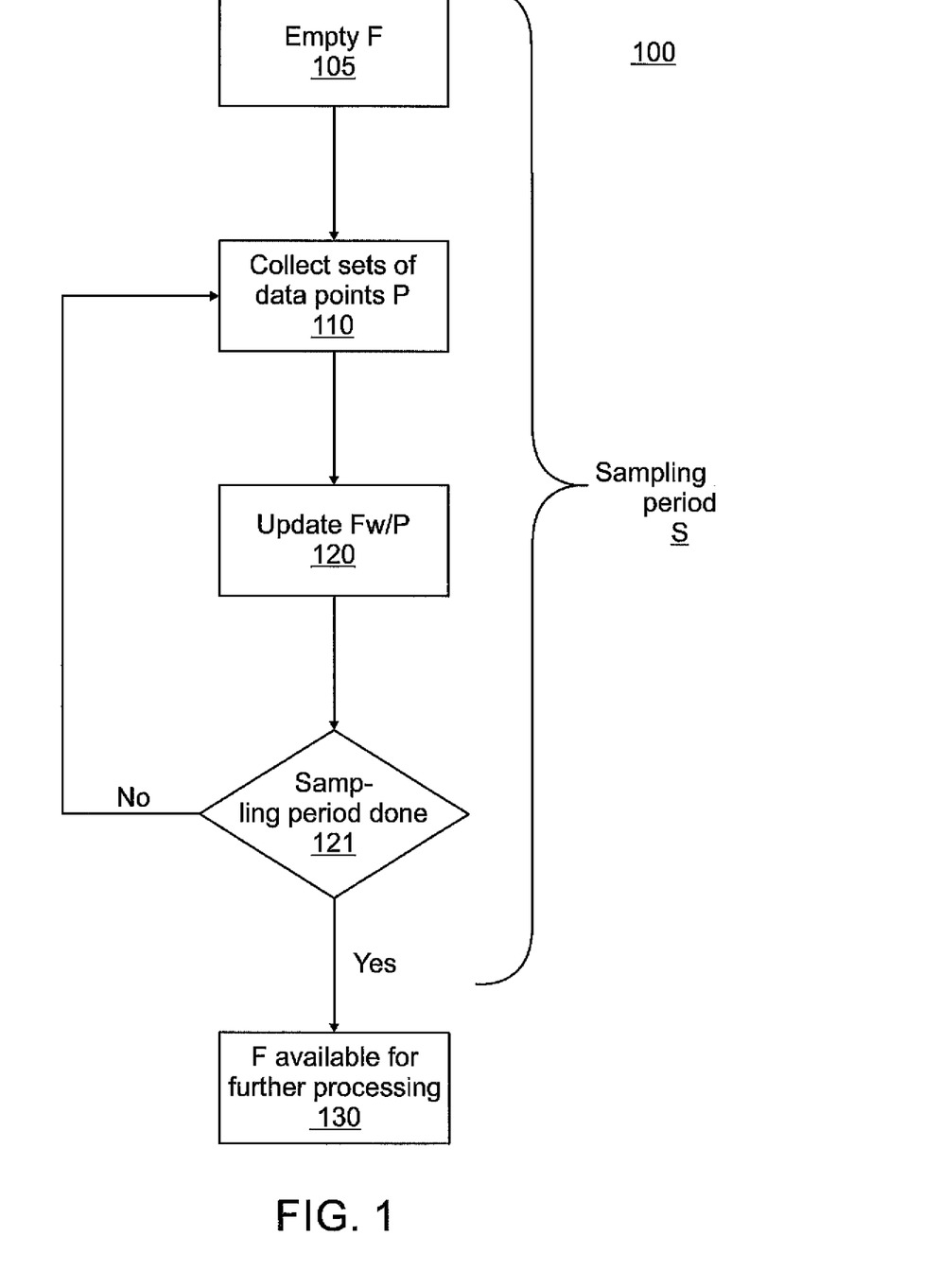
FIG. 1 is a flow-chart illustrating an illustrative embodiment of the present invention.

According to one example of the method as illustrated in FIG. 1, the method for measuring 100 metrics of a computer network from a server and/or a control center comprising the server, the method comprises the steps of:

providing 105 at the beginning of each sampling period S for each data source an empty fractile information instance, $F_{empty}$, of a type associated with the data source;

collecting 110 data points from a plurality of data sources throughout a sampling period (S), wherein a set of data points P constituting a sample is collected throughout each sampling period S for each data source;

updating 120 the fractile information instance F associated with each data source each data point throughout the sampling period S; and up-loading 130 the fractile information instances F to the control center after the end of each sampling period S, to be available for further processing.

According to further one example of the method, the method may comprise:

the collection of data points 110 from one or more data sources are performed by test agents;

each test agent updates 120 the fractile information instance F associated with each data source immediately after collecting each data point throughout the sampling period S;

each test agent up-loads 130 fractile information instances F to the control center after the end of each sampling period (S), to be available for further processing.

According to further one example of the method, the method may comprise:

the collection 110 of data points from each data source is performed by a test agent which collects all data points of a sample P throughout a sample time period S;

the test agents upload 121 the entire sample to the control center at the end of the sample time period S;

the control center produces a fractile information instance F from the received sample to be available for further processing 130.

According to further one example of the method, the method may comprise:

the control center starts 105 with an empty/reset fractile information instance F for each data source at the beginning of the sample time period S;

the test agents repeatedly upload 192 individual data points, or sets of data points, to the control center throughout the sampling period S;

the server is configured to update 120 the fractile information instance F immediately after receiving each data point from the respective test agent, for each data source, as it receives data-points throughout the sampling period S, wherein the fractile information instance F represents the entire sample at the end of the sampling period S and being available for further processing 130.

According to further one example of the method, the step of further processing 130 includes performing 132 advanced statistical analysis, such as computation of rank statistics 134, from the fractile information instance F without having access to the full sample.

According to further one example of the method, the step of collecting 110 includes a sampling period S, wherein a period between individual measurements as well as the length of the sampling period is varied 110 depending on one or more of the metric measured, a traffic rate in a part of the network where the measurement takes place.

According to further one example of the method, the step of collecting 110 sets of data points during a sampling period includes a sampling period S being the smallest time-frame where statistical analysis of data is supported.

According to further examples of the method:

the set of data points P collected from each data source are collected during a sampling period S that may be unique for each data source and set of data points P; and/or each data source is associated with a fractile information type that species how fractile information instances are processed and encoded, and decoded; and/or a reset is performed at the beginning of each sampling period for each data source yielding an empty fractile information instance, $F_{empty}$; and/or collected data points P, for each data source, are processed the by repeatedly updating 121 the associated fractile information instance F, throughout the sampling period; and/or the fractile information instance F, for each data source, is compressed and transmitted to a computing device or server for further processing when the sampling period S ends.

The steps as already described in the description herein referring to FIGS. 2 and 3 may be included in further examples of the exemplified method.

According to yet another example of the invention, a system is provided. Said system is connectably associated to a computer network comprising data sources. The system comprises a server and/or control center and to the data sources associated test agents, wherein the system is configured to provide 105 at the beginning of each sampling period S for each data source an empty fractile information instance, $F_{empty}$, of a type associated with the data source, and the test agents is configured to collect 110 data points from a plurality of data sources throughout a sampling period S, wherein a set of data points P constituting a sample is collected throughout each sampling period (S) for each data source and to update 120 the fractile information instance F associated with each data source each data point throughout the sampling period S, and to up-load 130 the fractile information instances F to the control center after the end of each sampling period S, to be available for further processing 130.

The invention claimed is:

1. A method comprising:
   collecting a set of data points from a plurality of data sources during a sampling period, wherein each data source of the plurality of data sources is associated with a fractile information type that specifies parameters for a fractile information instance associated with the data source, the fractile information instance including one or more counters, the one or more counters each corresponding to a count of data points falling within a different range of values of data points;

processing collected data points, for each data source, by repeatedly updating, during the sampling period, the one or more counters of the fractile information instance associated with the data source with counts of values of the collected data points, wherein an index to identify a counter to be updated is determined according to a pair of values comprising a mantissa and an exponent corresponding to a value of a data point of the collected data points; and transmitting the fractile information instance, for each data source, to a server for further processing.

2. The method according to claim 1, wherein each data source of the plurality of data sources is are associated with a plurality of fractile information instances, wherein, for each data source, exactly one fractile information instance is active during each sampling period, wherein, for each data source, the non-active fractile information instances are passive during each sampling period, wherein, for each data source, the active fractile information instance is empty at a beginning the sampling period, wherein, for each data source, the passive fractile information instances are transmitted or stored to be available for further processing, and wherein, for each data source, at least one passive fractile information instance can be recycled at an end of each sampling period to become an empty active fractile information instance for a following sampling period.

3. The method according to claim 1, wherein the collection of the data points from one or more data sources are performed by test agents, wherein each test agent updates the fractile information instance associated with each data source of the plurality of data sources after collecting each data point throughout the sampling period, and wherein each test agent uploads the fractile information instance to a control center after an end of each sampling period, to be available for further processing.

4. The method according to claim 1, wherein the collection of data points is performed by test agents which collect all data points of the set of data points throughout the sampling period, wherein the test agents upload the set of data points to a control center at an end of the sampling period, and wherein the control center produces the fractile information instance from the received set of data points to be available for further processing.

5. The method according to claim 4, wherein the control center starts with an empty fractile information instance for each data source of the plurality of data sources at a beginning of the sampling period, wherein the test agents repeatedly upload individual data points, or sets of data points, to the control center throughout the sampling period, wherein the server updates the fractile information instance after receiving each data point, for each data source, as it receives data points throughout the sampling period, and wherein the fractile information instance represents an entire set of data points at an end of the sampling period and is available for further processing.

6. The method according to claim 1, wherein the further processing includes performing statistical analysis based on the fractile information instance without having access to a full set of data points.

7. The method according to claim 1, wherein a period between individual measurements of metrics and a length of the sampling period is varied depending on one or more of: a metric measured, and a traffic rate in a part of a network where the measurement takes place.

8. The method according to claim 1, wherein the sampling period comprises a smallest time-frame where statistical analysis of data is supported.

9. The method according to claim 1, wherein a base 2 is used for the exponent.

10. The method according to claim 1, wherein a base 10 is used for the exponent.

11. The method according to claim 10, wherein principal representation of fractile information comprises an interval of exponents defining the values of the data points with smallest and largest absolute value and a fixed number of bits representing significant figures or mantissa.

12. The method according to claim 1, wherein further processing comprises storing a compressed fractile information instance in a database using a time stamp as a key and compressed fractile information of the compressed fractile information instance as a binary large object (BLOB).

13. The method according to claim 1, further comprising aggregating two or more original fractile information instances, representing the same data source but at different time frames, wherein aggregating the two or more original fractile information instances comprises computing new aggregate counters by adding corresponding counters from the two or more original fractile information instances.

14. The method according to claim 1, wherein each data source of the plurality of data sources is associated with an aggregation scheme.

15. A system comprising:

one or more processors; and memory storing instructions, that when executed, cause the one or more processors to:

collect a set of data points from a plurality of data sources during a sampling period, wherein each data source of the plurality of data sources is associated with a fractile information type that specifies parameters for a fractile information instance associated with the data source, the fractile information instance including one or more counters, the one or more counters each corresponding to a count of data points falling within a different range of values of data points;

process collected data points, for each data source, by repeatedly updating, during the sampling period, the one or more counters of the fractile information instance associated with the data source with counts of values of the collected data points, wherein an index to identify a counter to be updated is determined according to a pair of values comprising a mantissa and an exponent corresponding to a value of a data point of the collected data points; and transmit the fractile information instance, for each data source, to a server for further processing.

16. The system according to claim 15, wherein the memory stores instructions that cause the one or more processors to:
  collect the data points from one or more data sources with test agents,
  update, by each test agent, the fractile information instance associated with each data source after collecting each data point throughout the sampling period, and
  upload, by each test agent, the fractile information instance to a control center after an end of each sampling period, to be available for further processing.

17. The system according to claim 15, wherein the memory stores instructions that cause the one or more processors to:
  perform statistical analysis based on the fractile information instance without having access to an full set of data points.

18. The system according to claim 15, wherein the memory stores instructions that cause the one or more processors to:
  store a compressed fractile information instance in a database using a time stamp as a key and compressed fractile information of the compressed fractile information instance as a binary large object (BLOB).

19. Non-transitory processor-readable media, comprising instructions stored thereon, where the instructions cause at least one data processor to:
  collect a set of data points from a plurality of data sources during a sampling period, wherein each data source of the plurality of data sources is associated with a fractile information type that specifies parameters for a fractile information instance associated with the data source, the fractile information instance including one or more counters, the one or more counters each corresponding to a count of data points falling within a different range of values of data points;
  process collected data points, for each data source, by repeatedly updating, during the sampling period, the one or more counters of the fractile information instance associated with the data source with counts of values of the collected data points, wherein an index to identify a counter to be updated is determined according to a pair of values comprising a mantissa and an exponent corresponding to a value of a data point of the collected data points; and
  transmit the fractile information instance, for each data source, to a server for further processing.

20. The non-transitory processor-readable media of claim 19, wherein the instructions cause the at least one data processor to:
  collect the data points from one or more data sources with test agents,
  update, by each test agent, the fractile information instance associated with each data source after collecting each data point throughout the sampling period, and
  upload, by each test agent, the fractile information instance to a control center after an end of each sampling period, to be available for further processing.

* * * * *